United States Patent Office 3,020,295
Patented Feb. 6, 1962

3,020,295
THERAPEUTIC 4 - HYDROXY-19-NORTESTOSTER-
ONE-17-CYCLOPENTYL-PROPIONATE AND ITS
PROCESS OF PREPARATION AND ITS APPLI-
CATION
Bruno Camerino, Milan, and Bianca Patelli, Stradella,
Italy, assignors to Società Farmaceutici Italia, Milan,
Italy, a corporation of Italy
No Drawing. Filed July 12, 1960, Ser. No. 42,235
Claims priority, application Great Britain July 13, 1959
1 Claim. (Cl. 260—397.4)

The invention relates to 4-hydroxy-19-nortestosterone-17-cyclopentylpropionate having the following structural formula:

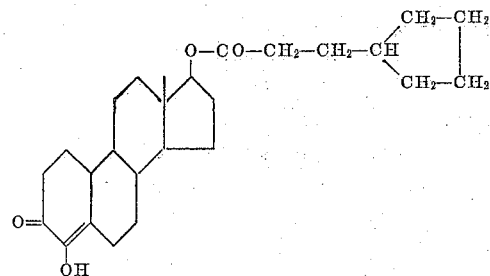

and to a process for its production.

The compound of the invention is very valuable due to its strong and delayed myotrophic activity.

Certain esters of 4-hydroxy-19-nortestosterone and also testosterone cyclopentylpropionate and 19-nortestosterone-cyclophenylpropionate possess the same general type of activity, but none of the compounds, so far as is known, exhibit as high an activity and as prolonged an effect as the compound of the invention.

The novel compound 4-hydroxy-9-nortestosterone-17-cyclopentylpropionate, preferably in the form of a solution in a fluid vehicle, such as a vegetable oil, a glycol, or in the form of a microcrystalline suspension in aqueous media, possesses a marked acute as well as extended myotrophic activity, which characteristics render the compound and compositions containing it useful in the treatment of certain pathological conditions such as those due to protein depletion. The invention therefore also includes a composition comprising 4-hydroxy-19-nortestosterone-17-cyclopentylpropionate and a pharmaceutically acceptable carrier compatible therewith.

The myotrophic activity of the product of the present invention is higher than that of testosterone cyclopentylpropionate from the 7th until the 28th day. Conversely, its androgenic effect is much lower: the therapeutic index of the new derivative is therefore definitely more favorable than that of testosterone cyclopentylpropionate. 4-hydroxy - 19 - nortestosterone-17-cyclopentylpropionate has also been used in humans, at the dose of 50 mg. once weekly. The results obtained show that the new derivative has a good anabolic effect (nitrogen retention, body weight increase, feeling of well being, improvement of deteriorating diseases, etc.) without apparent androgenic properties. No signs of toxicity were evident. In particular, blood pressure did not increase and no sodium retention appeared. Similar favorable results have been observed in premature infants and in stunted children, or children having growth defects, treated by injecting doses lower than 0.5 mg./kg. once weekly.

The process of the invention is directed to preparation of 4-hydroxy-19-nortestosterone-17-cyclopentylpropionate, in which 4,5 - epoxy-19-nortestosterone-17-cyclopentylpropionate is reacted with a mineral acid in an organic solvent. Preferably the 4,5-epoxy-19-nortestosterone - 17 - cyclopentylpropionate is prepared by acylating 4,5-epoxy-19-nortestosterone with a cyclopentylpropionic acid halide, which can in turn be prepared by treating 19-nortestosterone with hydrogen peroxide in an alkaline medium.

Thus 19-nortestosterone, dissolved in an organic solvent, preferably a water-miscible solvent, such as methanol or ethanol may be reacted with hydrogen peroxide in an alkaline medium, to obtain the 4,-5-epoxy-19-nortestosterone, which is acylated with cyclopentyl chloride or bromide in the presence of a tertiary amine, such as pyridine or dimethylaniline and thereafter the 4,5-epoxy - 19 - nortestosterone-17-cyclopentylpropionate recovered from the reaction mixture. The treatment of this product with aqueous mineral acid such as sulphuric acid, in an organic solvent, such as acetic acid, at about room temperature, provides the desired ester 4 - hydroxy - 19 - nortestosterone - 17 - cyclopentylpropionate.

The process steps of the invention are illustrated on the following reaction scheme:

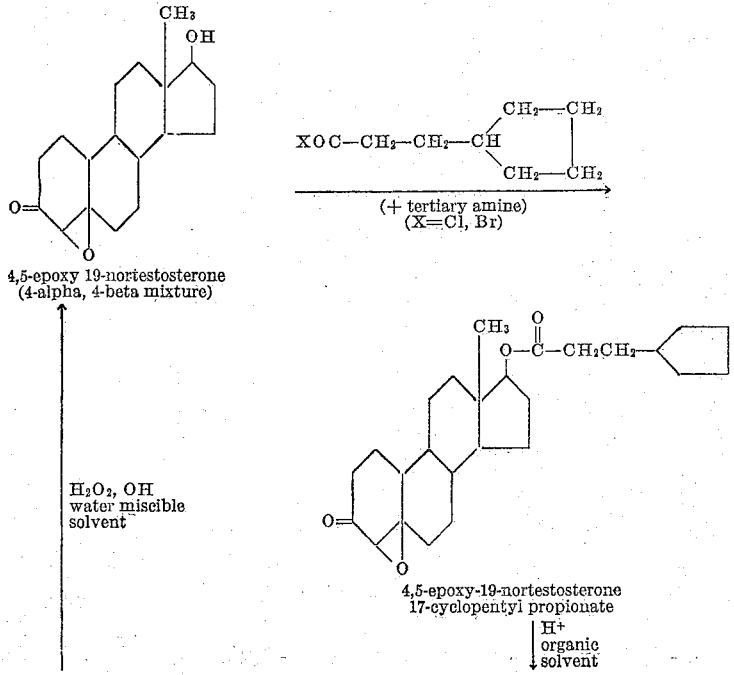

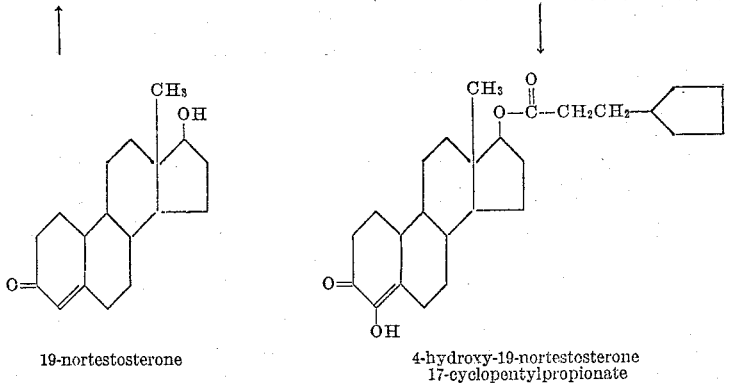

19-nortestosterone    4-hydroxy-19-nortestosterone
                      17-cyclopentylpropionate The invention is illustrated by the following examples:

EXAMPLE 1

*4,5-epoxy-19-nortestosterone-17-cyclopentylpropionate*

20.4 ml. of aqueous 4 N NaOH and 96 ml. of 35% $H_2O_2$ are added simultaneously to a solution of 40 g. of 19-nortestosterone dissolved in 800 ml. of methanol at 15° C. The solution is allowed to stand at about 0° C. for 30 minutes and then it is acidified with 6 ml. of acetic acid. The mixture is then diluted with an aqueous solution of NaCl and extracted with ethylacetate. The extract is washed to neutrality and then evaporated and the oily residue (which is constituted of 4-alpha, 5-epoxy and 4-beta, 5-epoxy-19-nortestosterone) is dissolved in 150 ml. of pyridine. The solution is cooled to −10° C. and treated, while stirring and over a period of one hour, with 40 ml. of cyclopentylpropionic acid chloride. After standing for a night at 0° C., ice water is added and the precipitate is filtered and washed with water. 72 g. of raw product are obtained, which are crystallized from an ether-petroleum ether mixture.

Yield: 45.5 g. of a mixture of 4-alpha, 5-epoxy and 4-beta, 5-epoxy-19-nortestosterone-17-cyclopentylpropionate.

EXAMPLE 2

*4-hydroxy-19-nortestosterone-17-cyclopentylpropionate*

A suspension of 45.5 grams of the preceding product in 14.4 ml. of acetic acid is treated with a mixture of 54 ml. of acetic acid and 13.5 ml. of conc. $H_2SO_4$. A complete dissolution results and after 10 minutes a solid product separates. After standing for 1 hour at room temperature, the product is filtered, washed with acetic acid, then with water and at last dried under vacuum.

24 grams of 4-hydroxy-19-nortestosterone-17-cyclopentylpropionate are obtained: M.P.=158–160° C; $\lambda$ max=276 m$\mu$, $\epsilon$=13,050. From mother liquors it is possible to recover, by extraction with methylene chloride, a further 3 grams of the same product melting at 155°–157° C. $[\alpha]_D$=+38° (C.=1% in $CHCl_3$).

EXAMPLE 3

*Pharmacological activity of 4-hydroxy-19-nortestosterone-17-cyclopentylpropionate*

4-hydroxy-19-nortestosterone-17-cyclopentylpropionate was evaluated in male castrated rats, 50 g. of body weight, injected subcutaneously with a single dose of steroid dissolved in olive oil. The animals were killed 7, 14, 21, 28 days after the injection and the weight of levator ani muscle and of ventral prostate were recorded. The results are summarized in Table I.

*Re Table I.—Delayed activity of 4-hydroxy-19-nortestosterone-17-cyclopentylpropionate*

The dose is expressed as mg. of testosterone and the organ's weight was referred to mg./100 g. of body weight. Therapeutic index (T.I.) is defined by the ratio of the increase of the weight of leavator ani muscle (Lev. ani) to that of the ventral prostate (V. Prost.), both referred to controls.

TABLE I

| Steroid | Dose, mg. | 7th day | | | 14th day | | | 21st day | | | 28th day | | |
|---|---|---|---|---|---|---|---|---|---|---|---|---|---|
| | | Lev. ani | V. Prost. | T.I. | Lev. ani | V. Prost. | T.I. | Lev. ani | V. Prost. | T.I. | Lev. ani | V. Prost. | T.I. |
| Testosterone-17-cyclopentylpropionate | 2 | 54.1 | 134.8 | 0.32 | 65.0 | 154.2 | 0.33 | 41.2 | 87.7 | 0.30 | 37.2 | 76.1 | 0.32 |
| 4-hydroxy-19-nortestosterone 17-cyclopentylpropionate | 1 | 46.5 | 50.8 | 0.91 | 45.4 | 32.2 | 1.25 | 43.7 | 16.7 | 2.69 | 29.6 | 11.1 | 2.55 |
| Do | 2 | 62.7 | 62.7 | 1.03 | 64.5 | 53.4 | 1.09 | 58.8 | 35.2 | 1.52 | 49.6 | 17.2 | 2.92 |
| Controls | | 17.4 | 18.8 | | 16.4 | 9.1 | | 16.8 | 7.5 | | 14.5 | 5.2 | |

The fluid vehicles which may be used for the preparation of the pharmaceutical forms, containing the compound of the present invention, are therapeutically acceptable vegetable oils, such as peanut oil, olive oil or therapeutically acceptable glycols such as glycerine, propylene glycol and the like.

We claim:

4-hydroxy-19-nortestosterone-17-cyclopentylpropionate having the following structural formula

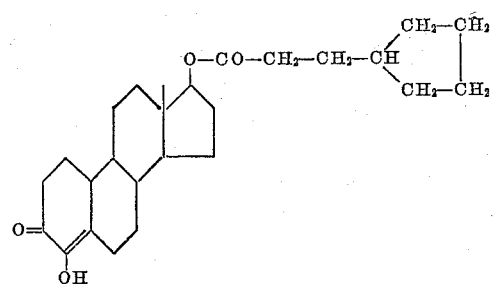

References Cited in the file of this patent

UNITED STATES PATENTS

| | | |
|---|---|---|
| 2,762,818 | Levy et al. | Sept. 11, 1956 |
| 2,842,571 | Camerino et al. | July 8, 1958 |
| 2,908,682 | Bible et al. | Oct. 13, 1959 |